UNITED STATES PATENT OFFICE 2,088,281

MANUFACTURE OF METAL SILICATES

William Alvah Smith, Hamburg, N. Y.

No Drawing. Application July 30, 1932,
Serial No. 627,130

9 Claims. (Cl. 23—110)

This invention relates to the manufacture of metal silicates, and particularly to the precipitated material resulting from the reaction between alkali silicates, with or without added caustic, and a substantially quantitative equivalent of metallic salts or mixtures thereof, or metallic salts in acid solution. I have discovered that metallic silicates when made by apparently the same reactions differ very materially in their characteristics and properties, including their activity with respect to other compounds or elements. The action of such metallic silicates in other chemical processes and treatments heretofore has been very undependable and uncertain, the results obtained from one batch of the metallic silicates being very different from those obtained from another batch of the same silicate, when made apparently by the same general process.

I have discovered an improved method of preparing such metal silicates, by means of which the properties and characteristics of the metal silicate may be regulated to some extent, and by means of which metal silicates that are uniform in the properties and characteristics desired, may be made repeatedly without difficulty and without failures.

The chemistry of alkali silicates, which are used as one of the basic reagents of the process, is little understood even by those working with such silicates continuously. Commercial grades of sodium silicate, for example, vary in ratio of sodium oxide to silica from about 1:1 to above 1:3.5. These ratios may be varied widely, and are so varied in practice by mixing together the proper proportions of silica and sodium carbonate and heating the mixture in a furnace, under more or less controlled conditions, to cause fusion to a "glass" which, when dissolved in water, is the so-called "water glass" or sodium silicate of commerce. Possibly, these alkali silicates are for the most part mixtures of different whole or half number ratio compounds, but in addition I have found it convenient to look upon these compounds as having absorbed an amount of free, possibly colloidal silicic acid.

Whether metallic precipitates made with the aid of these alkali silicates are mixtures of metallic oxides and silica, metallic hydroxides and silica, or true silicates I have not been able to determine definitely. The evidence rarely, in my opinion, indicates that the resulting improved dried material is an oxide mixture; and seldom has a definite hydroxide indication; so that the actual chemical structure of the materials remains undetermined. Photographic X-ray examination of a large number of metal silicate samples, prepared in accordance with my discovery, in substantially all cases showed either no pattern or only a faint pattern of silicic acid, indicating only a small percent of silicic acid of sufficient crystalline size to give a diffraction pattern.

In accordance with my invention, I form a solution of a salt of the metal whose silicate is desired. Among the salts which I have found especially useful for this purpose are the sulphates, nitrates and chlorides. In most cases there are several salts available for each metal. The sulphates, nitrates and chlorides may be used, and are usually easily available and inexpensive, but in some cases other salts may be used, such as formates, acetates, etc. The salts of two or more metals of like acid radicals, for example, may be used to make what may, for convenience, be termed a mixed metal silicate where the properties of two or more metals are desired.

The sulphates are preferable, because I have found them usually to be the most satisfactory and the least expensive, and also the degree of loss of water of crystallization of the metallic salt has the least effect. For example, anhydrous ferric sulphate is particularly useful in the manufacture of ferric silicate. The next in order of desirability are the crystalline nitrates, and the least desirable of the group mentioned are the crystalline chlorides. Judging from what little literature there is available relating to metal silicates, previous investigators apparently had used the chlorides in their work.

With reference to copper, the chloride salts, especially the anhydrous ones, are useful in the manufacture of gel-like materials. In fact, the filtrates from properly diluted chloride precipitations obtained by pouring the alkali silicate slowly and progressively into the metallic salt solution quite readily form gels of desirable properties when permitted to stand for a sufficient length of time.

The amount of metal salt which is used in the solution may be computed at an amount which is chemically equivalent to the alkali oxide of the alkali silicate, and should vary less than 10 percent from the theoretical amount required to obtain the most reactive metal silicate. While the variations should be less than 10 percent, I have found that materially better results are obtained if the variation is less than 4 percent from the theoretical amount required.

I also form another and separate solution of an alkali silicate, that is, a silicate of an alkali metal, and this solution preferably should contain at least 20 moles of water to 1 mole of silica, if highly reactive precipitates are to be obtained. I have found that an increase in dilution of the alkali silicate solution improves the reactivity of the product up to the maximum obtainable. The alkali silicate used in forming this solution preferably should have a ratio of moles of silica to alkali metal oxide greater than 2.25 to 1, or less than 1 to 1.

A ratio of less than 1 to 1 may be obtained by the addition of free caustic soda or sodium hydroxide to an alkali metal silicate. Addition of acid to the metallic salt solution followed by precipitation with a substantially chemically equal quantity of alkali silicate solution enables decrease of the metallic content of a precipitate. The metal silicates, which are obtained as precipitates when alkali silicates of other ratios are used, I have found are not as reactive, and it is important that uniform and high reactivity be present in metal silicates which are used in various chemical reactions, such as in the removal of sulphur from petroleum hydrocarbons.

The solutions, prepared as hereinabove explained, are then mixed, whereupon a precipitate containing the desired metal silicate is produced. I have found that the solutions should remain mixed for an appreciable length of time in order that the maximum amount of the precipitate may be obtained, and usually thirty minutes or more after mixing is required in which to obtain all of the precipitate. The manner of mixing the solutions has an important relation to the character of the product or precipitate produced.

The pouring or progressive adding of the alkali silicate solution slowly into the metallic salt solution may, for convenience, be termed the regular method of mixing the solution, and the pouring or progressive addition of the metallic salt solution slowly into the alkali silicate solution may be termed the reverse method of mixing. In the regular method, the precipitation is produced in a neutral or acid medium, and the metallic salt is in excess until the finish of the reaction. In the reverse method, the precipitation is produced in a solution of progressively decreasing alkalinity, that is, the alkali is in excess practically until the finish of the reaction.

I have found that when the solutions are mixed by the regular method, the precipitates are usually easier to filter and retain less water for a given pressure, and require much less press capacity on an equal pressure basis. The metal silicates obtained by the regular method have a lower apparent density than those obtained by the reverse method in most cases. When a dense metal silicate is desired, the reverse method of mixing is preferable and when a light metal silicate is desired, the regular method of mixing is preferable.

When the metal silicate is to be used in the treatment of gas, such as illuminating gas or natural gas, to remove impurities, such as gums, resins and various sulphur compounds, a hard, dense material which does not easily disintegrate into a powder is preferable and, hence, when the metal silicate for this purpose is prepared, the reverse method of mixing may be advantageously used. When a metal silicate is produced for use in removing gums, resins, or sulphur impurities from liquids, as in the treatment of petroleum products, such as gasoline or lubricating oils, which is to be revivified in an air stream, a lighter material is desirable, and to obtain this the regular method of mixing is utilized. The precipitate obtained by the regular method is slightly more reactive and of less density, and hence a lesser quantity is required in treating a given quantity of petroleum products. The regular method is particularly useful in the manufacture of mixed metal silicates.

The precipitate obtained by the mixing of the solutions, whether by the regular or reverse method of mixing, does not usually settle out readily and, therefore, I have found that pressure filtration is desirable in order to separate the precipitate from the solution. Pressure filters are well known in the art and any of them may be employed. The filter cake obtained from the filtration is next placed in a dryer and the moisture removed. I have discovered that the more rapidly the filter cake is dried, the more reactive it is. I have also discovered that when the filter cake or precipitate is dried in the presence of air, particularly at temperatures above room temperatures, the reactivity of the product is greatly reduced, although drying in air increases the strength and hardness of the product.

For most uses greater reactivity is desired and, therefore, the drying is preferably carried out in substantial absence of air, and as rapidly as possible. This rapid drying in the absence of air may be obtained by placing the filter cake or precipitate in a vacuum chamber. The partial vacuum created in the chamber converts the moisture into a vapor which fills the space in the chamber and displaces most or all of the air which is easily removed. In this manner I obtain the advantages of rapid drying as well as the drying in the absence of air.

I have also found that the drying action is materially improved if some steam, within the capacity of the vacuum pump attached to the vacuum chamber, is added to the chamber before or during the drying operation. This steam adds its heat directly to the filter cake or precipitate and thus aids in the drying. The dried precipitate is then ready for use, and may be ground if desired. The filter cake may be first cut into particles of the desired sizes and then dried, whenever one desires to obtain a metal silicate in particular sizes for special uses.

In the commercial manufacture of metal silicates, it is difficult to secure exactly equivalent reactions and I have discovered that an excess of the metallic salt is more desirable than an excess of the alkali silicate. This may be due to the fact that a slight excess of the metallic salt permits a more complete reaction to take place.

The dilution of the metallic salt employed is also of some importance. Some metallic salts, such as mercuric chloride, and zinc sulphate, for example, work well in apparently concentrated solutions, while others require greater dilution for the best results. For the same metal, different salts may show marked differences in the finished product depending upon the dilution as well as the metal of the salt. However, if the dilution of the metallic salt is sufficient, dilutions beyond this point have very little effect upon the characteristics or properties of the silicate, except to permit variations in the percentage of the alkali salt left in the finished product from the filtering operation, which is a very useful fact, particularly where filter press pressures are limited. In this connection, it should be noted that impurities in the water should be counteracted by adjustment of reagent quantities, preferably in the metallic salt quantity. Generally, the more concentrated salt solutions, such as those approaching 20 cc. of water to the amount of metallic salt necessary to neutralize or react with one gram of sodium oxide, tend to result in lower volumetric densities but this rule does not always hold however. As a rule, a good metallic silicate results where the dilution of the metallic salt is above 30 cc. of water to the same amount of metallic salt, presuming correct dilution of the alkali silicate.

The dilution of the alkali silicate has been mentioned briefly hereinabove, but some further explanation may be made. Alkali silicates have differing ratios of alkali and silica and, therefore, a coordination of dilutions becomes necessary in manufacturing metal silicates of uniform and similar characteristics or properties. The dilution of the alkali metal silicate should be proportional to the molal concentration of the silica, rather than proportional to the sodium oxide constituent. Recognition of this fact enables metal silicates of similar characteristics and properties to be made from any given metallic salt and any ratio of alkali silicate, making it possible to work at will with any alkali silicate if the metallic salt characteristics are known.

When working with copper salts, I have found that the copper precipitates fall off in reactivity for dilutions of the alkali silicates below approximately 35 moles of water per mole of silica, and this decrease in reactivity is more noticeable when the mixture is by the regular method, than by the reverse method, of mixing. If the dilution falls much below 20 moles of water per mole of silica, the resulting materials are of very low reactivity. I have also discovered that the alkali metal silicate dilutions resulting in products of low apparent volumetric density by the regular method of mixing to obtain precipitation, are approximately the dilutions giving products of high density by the reverse method of mixing, particularly when the precipitates are dried in the presence of air.

The dilution of the alkali silicate solution has a marked bearing on the density of a precipitate made in the regular manner with a copper sulphate solution, the least dense material being produced when the alkali silicate dilution is from 80 to 120 moles of water per mole of silica, and of greater density for lesser and greater dilutions.

The speed of precipitation is also of importance. The time required to precipitate a metal silicate has a marked effect both on the apparent volumetric density and the reactivity. When the stirring is constant, low speed precipitations by the regular method of mixing yield low apparent volumetric density silicates, but when the reverse method of mixing is used, I have obtained high apparent volumetric density silicates. The reactivity of silicates precipitated following the reverse method of mixing, when the precipitation is slow, is decidedly inferior to the silicate precipitated rapidly by the reverse method of mixing, but when the mixing is by the regular method, the time of precipitation has practically no effect on the reactivity of the precipitate.

Dilution of the mixture of solutions, when the dilution occurs after the mixing, has little effect on the apparent volumetric density of the silicate but improves the activity of the precipitate, probably due to the reduction of the soluble salts present. The yield however, is slightly reduced, possibly because of the inability of the filtering medium to retain the particles, although some solution of the precipitate appears to occur. The temperature of the solution during precipitation also has an influence upon the characteristics and properties of the product. Within limits, low precipitation temperatures yield more active materials than temperatures approaching the boiling point, but the improvement below ordinary room temperature is not marked. High temperatures tend to increase the apparent volumetric density when the mixing is by the regular method, and tend to lower the volumetric density of the precipitate when the mixing is by the reverse method.

The dryness of filtration somewhat influences the character of the product. Generally, silicates that are more completely dried by filtration are slightly more reactive, require less heat for drying, are easier to handle in a mechanical dryer, yield less alkali salt in the finished material, and the press cake tonnage capacity for a given pressure is greater with a dryer cake. The influence of the drying atmosphere has been mentioned briefly hereinabove, but will now be discussed in greater detail. I have found that drying the metal silicates in contact with air, particularly at elevated temperatures, results in a decrease in reactivity of the product, but increases to a remarkable degree the mechanical strength and volumetric density of the metal silicate which, in many cases, is an advantage that offsets the decrease in reactivity.

The discoveries hereinabove set forth are applicable to the silicates of all the metals except aluminum, but copper silicates prepared in accordance with this invention have been found particularly valuable in connection with the treatment of petroleum products and natural and manufactured illuminating gas, particularly in the removal of sulphur, gums and resins from such products and gas. The usefulness of such metal silicates heretofore has been practically nil, because different treatments by different batches of metal silicates, that were made by apparently the same process, gave widely different results for reasons that could not be explained. By means of this invention, it is now possible to produce a metal silicate of desired characteristics and properties, and all of the silicates so produced will be uniform in their characteristics, properties, and action.

It will be obvious that various changes in the proportions, materials and other details, which have been herein described in order to explain the nature of the invention, may be made by those skilled in the art within the principle and scope of the invention as expressed in the appended claims.

I claim:

1. In the method of precipitating an insoluble metallic silicate from a relatively dilute solution of an alkali metal silicate, by a solution of a salt of another metal in which the amount of the other metal is at least approximately sufficient to effect complete substitution of the alkali metal, that improvement pertaining to the control of the reactivity of the insoluble metallic silicate which comprises maintaining the mixture while the precipitate forms, separating the precipitate from the solution, and drying the precipitate at a speed which is higher when a high chemical reactivity of the precipitate is desired, and less when lesser chemical reactivity is desired.

2. In the method of precipitating an insoluble metallic silicate from a relatively dilute solution of an alkali metal silicate, by a solution of a salt of another metal in which the amount of the other metal is at least approximately sufficient to effect complete substitution of the alkali metal, that improvement pertaining to the control of the reactivity of the insoluble metallic silicate which comprises maintaining the mixture while the precipitate forms, separating the precipitate from the solution, and drying the precipitate in the substantial absence of air at a speed which is higher when a high chemical reactivity of the precipitate is desired, and less when lesser chemical reactivity is desired.

3. In the method of precipitating an insoluble metallic silicate from a relatively dilute solution of an alkali metal silicate, by a solution of a salt of another metal in which the amount of the other metal is at least approximately sufficient to effect complete substitution of the alkali metal, that improvement pertaining to the control of the reactivity of the insoluble metallic silicate which comprises maintaining the mixture while the precipitate forms, separating the precipitate from the solution, displacing the air around the precipitate by steam, and then drying the precipitate in the substantial absence of the displaced air.

4. In the method of precipitating an insoluble metallic silicate from a relatively dilute solution of an alkali metal silicate, by a solution of a salt of another metal in which the amount of the other metal is at least approximately sufficient to effect complete substitution of the alkali metal, that improvement pertaining to the control of reactivity of the insoluble metallic silicate which comprises regulating the dilution of the silicate solution used, in accordance with the reactivity of the product desired, by increasing the dilution when greater reactivity of the product is desired and decreasing it when lesser reactivity of the product is desired, maintaining the mixture while the precipitate forms, separating the precipitate from the solution, and drying the precipitate.

5. In the method of precipitating an insoluble metallic silicate from a relatively dilute solution of an alkali metal silicate, by a solution of a salt of another metal in which the amount of the other metal is at least approximately sufficient to effect complete substitution of the alkali metal, that improvement pertaining to the control of the reactivity of the insoluble metallic silicate which comprises maintaining the mixture while the precipitate forms, separating the precipitate from the solution, and drying the separated precipitate in an atmosphere containing an amount of free oxygen which is large when great mechanical strength in the metal silicate of the precipitate is desired, and decreased when lesser mechanical strength, but increased reactivity of the precipitate is desired.

6. In the method of precipitating an insoluble metallic silicate from a relatively dilute solution of an alkali metal silicate, by a solution of a salt of another metal in which the amount of the other metal is at least approximately sufficient to effect complete substitution of the alkali metal, that improvement pertaining to the control of the reactivity of the insoluble metallic silicate which comprises maintaining the mixture while the precipitate forms, separating the precipitate from the solution, displacing the air surrounding the precipitate with steam, and drying the precipitate in an atmosphere of said steam.

7. In the method of precipitating an insoluble metallic silicate from a relatively dilute solution of an alkali metal silicate, by a solution of a salt of another metal in which the amount of the other metal is at least approximately sufficient to effect complete substitution of the alkali metal, that improvement pertaining to the control of the reactivity of the insoluble metallic silicate which comprises maintaining the mixture while the precipitate forms, separating the precipitate from the solution, drying said precipitate in a chamber having a partial vacuum therein, and adding a limited amount of steam to said chamber during the drying.

8. In the method of precipitating an insoluble metallic silicate from a relatively dilute solution of an alkali metal silicate, by a solution of a salt of another metal in which the amount of the other metal is at least approximately sufficient to effect complete substitution of the alkali metal, that improvement pertaining to the control of the reactivity of the insoluble metallic silicate which comprises varying the order in which the solutions are added one to the other, to determine the density of the precipitate, by adding the silicate solution progressively to the metal salt solution when a metal silicate of minimum density is desired, and adding the metal salt solution progressively to the silicate solution when a metal silicate of maximum density is desired.

9. In the method of precipitating an insoluble metallic silicate from a relatively dilute solution of an alkali metal silicate, by a solution of a salt of another metal in which the amount of the other metal is at least approximately sufficient to effect complete substitution of the alkali metal, that improvement pertaining to the control of the reactivity of the insoluble metallic silicate which comprises utilizing a solution of the silicate of the alkali metal which has at least approximately twenty moles of water to one mole of silica, and a ratio of moles of silica to alkali metal oxide greater than approximately 2.25 to 1 or less than approximately 1 to 1, mixing the solutions to form a precipitate, varying the order in which the solutions are added one to the other to determine the density of the precipitate, by adding the silicate solution progressively to the metal salt solution when a metal silicate of minimum density is desired, and adding the metal salt solution progressively to the silicate solution when a metal silicate of maximum density is desired, and then separating and drying the precipitate.

WILLIAM ALVAH SMITH.